(12) United States Patent
Ritchie et al.

(10) Patent No.: US 7,257,528 B1
(45) Date of Patent: Aug. 14, 2007

(54) METHOD AND APPARATUS FOR CHINESE CHARACTER TEXT INPUT

(75) Inventors: Wallace A. Ritchie, Sai Kung (HK); Samuel Pun, Calgary (CA); Weigen Qiu, Calgary (CA)

(73) Assignee: Zi Corporation of Canada, Inc., Calgary (CA)

(*) Notice: Subject to any disclaimer, the term of this patent is extended or adjusted under 35 U.S.C. 154(b) by 0 days.

(21) Appl. No.: 09/023,259

(22) Filed: Feb. 13, 1998

(51) Int. Cl.
*G06F 17/28* (2006.01)

(52) U.S. Cl. ............... 704/7; 704/3; 341/28; 715/542
(58) Field of Classification Search ........... 704/1–10; 707/535, 536, 541, 542; 379/88.01, 88.05, 379/88.06; 400/109, 110, 111; 341/22, 28; 382/185; 345/171; 715/542

See application file for complete search history.

(56) References Cited

U.S. PATENT DOCUMENTS

| | | | |
|---|---|---|---|
| 2,950,800 A | 8/1960 | Caldwell | |
| 3,647,973 A | 3/1972 | James et al. | 379/93.27 |
| 3,967,273 A | 6/1976 | Knowlton | 341/22 |
| 4,189,779 A | 2/1980 | Brautingham | 704/265 |
| 4,191,854 A | 3/1980 | Coles | 379/93.18 |
| 4,286,329 A | 8/1981 | Goertzel et al. | |
| 4,360,892 A | 11/1982 | Endfield | 707/534 |
| 4,379,288 A | 4/1983 | Leung et al. | 341/28 |
| 4,381,502 A | 4/1983 | Prame | 341/26 |
| 4,426,555 A | 1/1984 | Underkoffler | 379/93.18 |
| 4,427,848 A | 1/1984 | Tsakanikas | 379/88.16 |
| 4,438,505 A | 3/1984 | Yanagiuchi et al. | 704/7 |
| 4,442,506 A | 4/1984 | Endfield | 341/22 |
| 4,481,508 A | 11/1984 | Kamei et al. | 345/171 |
| 4,500,872 A | 2/1985 | Huang | 341/28 |
| 4,549,279 A | 10/1985 | Lapeyre | 708/145 |
| 4,559,615 A | 12/1985 | Goo et al. | 707/535 |
| 4,649,563 A | 3/1987 | Riskin | 379/93.27 |
| 4,661,916 A | 4/1987 | Baker et al. | 704/260 |
| 4,674,112 A | 6/1987 | Kondraske et al. | 379/93.18 |
| 4,677,659 A | 6/1987 | Dargan | 379/93.27 |
| 4,684,926 A | 8/1987 | Yong-Min | |

(Continued)

FOREIGN PATENT DOCUMENTS

AU 48259 6/1979

(Continued)

OTHER PUBLICATIONS

Minneman; 1985; A Simplified Touch-Tone® Telecommunication Aid for Deaf and Hearing Impaired Individuals: RESNA 8th Annual Conference, Memphis, Tennessee, pp. 209-211.

(Continued)

*Primary Examiner*—Richemond Dorvil
*Assistant Examiner*—Qi Han
(74) *Attorney, Agent, or Firm*—Cesari & McKenna, LLP

(57) ABSTRACT

A method and apparatus for inputting Chinese character text into a machine such as a word processor or personal computer. The system consists of an apparatus which forms a closed feedback loop with the operator. The operator supplies stroke selections and other data to the apparatus which presents character selection information in response to the user's input. As a consequence of the feedback provided to the operator and subsequent actions by the operator, the desired Chinese text is produced with significant improvements in speed and ease.

19 Claims, 10 Drawing Sheets

U.S. PATENT DOCUMENTS

| | | | |
|---|---|---|---|
| 4,689,743 A | 8/1987 | Chiu | 341/20 |
| 4,692,865 A | 9/1987 | Hsu | 707/535 |
| 4,754,474 A | 6/1988 | Feinson | 379/93.18 |
| 4,791,408 A | 12/1988 | Heusinkveld | 700/84 |
| 4,817,129 A | 3/1989 | Risken | 379/88.24 |
| 4,823,294 A | 4/1989 | Rouhani | 708/142 |
| 4,829,583 A | 5/1989 | Monroe et al. | 382/185 |
| 4,846,598 A | 7/1989 | Livits | 400/472 |
| 4,849,732 A | 7/1989 | Dolenc | 341/20 |
| 4,866,759 A | 9/1989 | Riskin | 379/93.27 |
| 4,872,196 A | 10/1989 | Royer et al. | 455/564 |
| 4,891,777 A | 1/1990 | Lapeyre | 708/130 |
| 4,937,745 A | 6/1990 | Carmon | |
| 4,951,202 A | 8/1990 | Yan | 707/535 |
| 4,954,955 A | 9/1990 | Chiu | |
| 5,031,206 A | 7/1991 | Riskin | 379/93.27 |
| 5,035,205 A | 7/1991 | Schiller et al. | 119/168 |
| 5,063,376 A | 11/1991 | Chang | 395/163 |
| 5,065,661 A | 11/1991 | Hacker | 84/719 |
| 5,067,103 A | 11/1991 | Lapeyre | 708/146 |
| 5,087,910 A | 2/1992 | Guyot-Sionnest | 345/169 |
| 5,109,352 A * | 4/1992 | O'Dell | 715/542 |
| 5,119,296 A | 6/1992 | Zheng et al. | 707/535 |
| 5,128,672 A | 7/1992 | Kaehler | 341/23 |
| 5,131,045 A | 7/1992 | Roth | 704/237 |
| 5,156,475 A | 10/1992 | Zilberman | 400/472 |
| 5,163,084 A | 11/1992 | Kim et al. | 379/88.01 |
| 5,164,900 A * | 11/1992 | Bernath | 707/535 |
| 5,187,480 A | 2/1993 | Thomas et al. | |
| 5,197,810 A * | 3/1993 | Zhang et al. | 400/110 |
| 5,198,978 A | 3/1993 | Garneau et al. | 704/8 |
| 5,200,988 A | 4/1993 | Riskin | 379/52 |
| 5,210,689 A | 5/1993 | Baker et al. | 704/1 |
| 5,212,638 A | 5/1993 | Bernath | 707/535 |
| 5,212,769 A | 5/1993 | Pong | 345/467 |
| 5,214,689 A | 5/1993 | O'Sullivan | 379/88.1 |
| 5,218,538 A | 6/1993 | Zhang | 707/534 |
| 5,229,936 A | 7/1993 | Decker et al. | 704/10 |
| 5,251,293 A | 10/1993 | Ishii et al. | 707/542 |
| 5,255,189 A | 10/1993 | Woo | 707/535 |
| 5,255,310 A | 10/1993 | Kim et al. | 379/88.01 |
| 5,258,748 A | 11/1993 | Jones | 345/172 |
| 5,270,927 A * | 12/1993 | Sproat | 707/535 |
| 5,281,966 A | 1/1994 | Walsh | 341/22 |
| 5,289,394 A | 2/1994 | Lapeyre | 708/142 |
| 5,295,238 A | 3/1994 | Dickson | 345/471 |
| 5,304,988 A | 4/1994 | Seto et al. | |
| 5,305,205 A | 4/1994 | Weber et al. | 707/531 |
| 5,317,647 A | 5/1994 | Pagallo | 382/161 |
| 5,319,552 A | 6/1994 | Zhong | 707/535 |
| 5,331,557 A * | 7/1994 | Liu | 707/535 |
| 5,339,358 A | 8/1994 | Danish et al. | 379/368 |
| 5,360,343 A | 11/1994 | Tang | 434/118 |
| 5,388,061 A | 2/1995 | Hankes | 708/142 |
| 5,392,338 A | 2/1995 | Danish et al. | 379/93.23 |
| 5,475,767 A | 12/1995 | Du | 382/185 |
| 5,488,363 A | 1/1996 | Peng | 341/28 |
| 5,524,198 A | 6/1996 | Matsumoto et al. | 345/340 |
| 5,535,119 A * | 7/1996 | Ito et al. | 704/3 |
| 5,548,634 A | 8/1996 | Gahang et al. | 379/93.27 |
| 5,586,198 A * | 12/1996 | Lakritz | 382/185 |
| 5,634,134 A | 5/1997 | Kumai et al. | 707/536 |
| 5,649,223 A * | 7/1997 | Freeman | 341/28 |
| 5,724,031 A * | 3/1998 | Huang | 341/28 |
| 5,790,055 A * | 8/1998 | Yu | 341/28 |
| 5,818,437 A | 10/1998 | Grover et al. | 345/326 |
| 5,860,075 A | 1/1999 | Hashizume et al. | |
| 5,893,133 A * | 4/1999 | Chen | 707/535 |
| 5,926,566 A * | 7/1999 | Wang et al. | 382/185 |
| 6,005,549 A | 12/1999 | Forest | |
| 6,011,554 A | 1/2000 | King et al. | |
| 6,014,625 A | 1/2000 | Lee | |
| 6,028,959 A | 2/2000 | Wang et al. | |
| 6,054,941 A | 4/2000 | Chen | |
| 6,148,104 A | 11/2000 | Wang et al. | |
| 6,172,625 B1 | 1/2001 | Jin et al. | |
| 6,307,548 B1 | 10/2001 | Flinchem et al. | |
| 6,636,162 B1 | 10/2003 | Kushler et al. | |
| 6,646,573 B1 | 11/2003 | Kushler et al. | |
| 6,795,579 B2 | 9/2004 | Tang et al. | |
| 2004/0163032 A1 | 8/2004 | Guo et al. | |

FOREIGN PATENT DOCUMENTS

| | | |
|---|---|---|
| CN | 1180187 A | 4/1998 |
| EP | 0 300 495 | 1/1985 |
| EP | 0196355 | 10/1986 |
| EP | 0 204 536 | 12/1986 |
| EP | 0 319 193 A3 | 6/1989 |
| EP | 0 464 726 A2 | 1/1992 |
| EP | 0 540 147 A2 | 5/1993 |
| EP | 0 574 110 A1 | 12/1993 |
| EP | 0 651 315 A1 | 5/1995 |
| EP | 0 689 122 A1 | 12/1995 |
| GB | 2 062 916 | 9/1980 |
| GB | 2 060 231 | 4/1981 |
| GB | 2 066 534 | 7/1981 |
| GB | 2116341 A | 9/1983 |
| GB | 2118749 A | 11/1983 |
| GB | 2125197 A | 2/1984 |
| JP | 62-180458 | 8/1987 |
| JP | 05-081482 | 4/1993 |
| JP | 08-305701 | 11/1996 |
| JP | 11-328312 | 11/1999 |
| WO | WO89/05745 | 6/1989 |
| WO | WO90/07149 | 6/1990 |
| WO | WO94/03887 | 2/1994 |
| WO | WO2004/111812 | 12/2004 |

OTHER PUBLICATIONS

Levine et al.; 1986; Computer Disambiguation of Multi-Character Key Text Entry: An Adaptive Design Approach: CH2364-8/86/0000-0298 IEEE, pp. 298-301.

Foulds et al.; 1987; Statistical Disambiguation of Multi-Character Keys Applied to Reduce Motor Requirements for Augmentative and Alternative Communication: 0743-4618/87/0304-0192.

Levine et al.; 1987; Multi-Character Key Text Entry Using Computer Disambiguation: RESNA 10th Annual conference, San Jose, California, pp. 177-178.

Kamphuis et al.; 1989; KATDAS; A Small Number of Keys Direct Access System: RESNA 12th Annual Conference, New Orleans, Louisiana, pp. 278-279.

Kreifeldt et al.; 1989; Reduced Keyboard Designs Using Disambiguation: Proceedings of the Human Factors Society 33rd Annual Meeting, pp. 441-444.

Arnott et al.; Sep. 1992; Probabilistic Character Disambiguation for Reduced Keyboards Using Small Text Samples: 0743-4618/92/0803-0215, pp. 215-223.

Oommen et al.; 1992; Correction to "An Adaptive Learning Solution to the Keyboard Optimization Problem": 0018-9472/92 IEEE.

"Speed Keyboard for Data Processor," IBM Technical Disclosure Bulletin, Bol. 23, pp. 838-839, Jul. 1980. © IBM Corp., 1993.

Levine, S. H. et al., "Adaptive Technique for Customized Interface Design With Application to Nonvocal Communication," *RSNA 9th Annual Conference*, Minneapolis, Minnesota, 1986.

Levine, S.H., "An Adaptive Approach to Optimal Keyboard Design for Nonvocal Communication," *IEEE*, 1985. 1985 Proceedings of Int. Conf. on Cybernetics & Society p. 334-7.

Swiffin, A.L. et al., "Adaptive and Predictive Techniques in a Communication Prosthesis," *AAC Augmentative and Alternative Communication* (1987).

Swiffin, A.L. et al., "PAL: An Effort Efficient Portable Communication Aid and Keyboard Emulator," *RESNA 8th Annual Conference*, Memphis, Tennessee, 1985.

Smith, Sidney L. et al., "Alphabetic Data Entry Via the Touch-Tone Pad: A Comment," *Human Factors*, 13(2), pp. 189-190, 1971.

Witten, I.H., Principles of Computer Speech, New York: Academic Press, (1982), pp. 246-253.

Foulds, R. et al., "Lexical Prediction Techniques Applied to Reduce Motor Requirements for Augmentative Communication," *RESNA 10th Annual Conference*, San Jose, California, 1987.

King. M.T., "JustType™—Efficient Communication with Eight Keys," *Proceedings of the RESNA '95 Annual Conference*, Vancouver, BC, Canada, 1995.

Matias, E. et al., "Half-QWERTY: Typing With One Hand Using Your Two-Handed Skills," *Conference Companion, CHI '94*, (Apr. 24-28, 1994).

Suginoto, M. et al., "SHK: Single Hand Key Card for Mobile Devices," *CHI 1996* (Apr. 13-18, 1996).

Pong, Man-Chi et al., "cxterm: A Chinese Terminal Emulator for the X Window System", Software Practice & Experience, vol. 22, No. 10, Oct. 1, 1992.

* cited by examiner

FIG. 1A 29 Basic Strokes:

| ` | — | ｜ | ノ | ＼ | ／ | ７ | ⊐ |
|---|---|---|---|---|---|---|---|
| ⁊ | ⌐ | ∠ | ⟨ | ⇂ | ⌐ | ⌐ | ⇁ |
| ろ | ろ | 」 | ) | ⌊ | ∪ | ⌣ | L |
| L | L | ⇃ | ⇂ | ⇂ | | | |

8 Stroke Categories:

| — | ｜ | ノ | ` | ７ | ∠ | ) | ⌐ |
|---|---|---|---|---|---|---|---|

5 Stroke Categories:

| — | ｜ | ノ | ` | ７ |
|---|---|---|---|---|

FIG. 1B 29 to 8 classification

| — ／ | — |
|---|---|
| ｜ 」 | ｜ |
| ノ | ノ |
| ` ＼ | ` |
| ７ ⊐ ⁊ ⌐ ろ ろ ろ | ７ |
| ∠ ⟨ ⇂ ∪ ⌊ L L ⇃ ⇂ ⇂ | ∠ |
| ) | ) |
| ⌐ ⌐ ⇁ | ⌐ |

FIG. 1C 29 to 5 classification

| — ／ | — |
|---|---|
| ｜ 」 | ｜ |
| ノ | ノ |
| ` ＼ | ` |
| ７ ⊐ ⁊ ⌐ ろ ろ ろ ∠ ⟨ ⇂ ∪ ⌊ L L ⇃ ⇂ ⇂ ) ⌐ ⌐ ⇁ | ７ |

| 字元 | 回碼 | 部件 | | | 碼數 | 筆跡 | | | | | | | | |
|---|---|---|---|---|---|---|---|---|---|---|---|---|---|---|
| 啊 | 80A1 | 口 | 阝 | 可 | 10 | 丨 | ㄱ | 一 | ㄱ | 丨 | 一 | 丨 | ㄱ | 一 | 丨 |
| 阿 | 80A2 | 阝 | 可 | | 7 | ㄱ | 丨 | 一 | 丨 | ㄱ | 一 | 丨 | | |
| 埃 | 80A3 | 土 | 厶 | 矢 | 10 | 一 | 丨 | 一 | ㄴ | 丶 | ノ | 一 | 一 | 八 |
| 挨 | 80A4 | 扌 | 厶 | 矢 | 10 | 一 | 丨 | 一 | ㄴ | 丶 | ノ | 一 | 一 | 八 |
| 哎 | 80A5 | 口 | 艹 | 乂 | 8 | 丨 | ㄱ | 一 | 一 | 丨 | 丨 | ノ | 八 | |
| 唉 | 80A6 | 口 | 厶 | 矢 | 10 | 丨 | ㄱ | 一 | ㄴ | 丶 | ノ | 一 | 一 | 八 |
| 哀 | 80A7 | 亠 | 口 | 伙 | 9 | 丶 | 一 | 丨 | ㄱ | 一 | ノ | 一 | 八 | |
| 皚 | 80A8 | 白 | 山 | 己 | 11 | ノ | 丨 | ㄱ | 一 | 一 | 丨 | 一 | 丨 | ㄱ 一 ㄴ |

↑ 2.1 Character  ↑ 2.2 Component composition  ↑ 2.3 Stroke composition

FIG. 2

```
8.1     Character_Table: array of structure CharInfo

Structure CharInfo:
8.2         UCHAR ucStrokes[12];  // Stroke composition Info
                                  // 24 strokes stored as nyblles
8.3         ULONG ulComponents;   // 10 bit first drawn component
                                  // 10 bit second drawn component
                                  // 8 bit KangXi radical
                                  // 4 bits of properties
8.4         USHORT usFreq;        // frequency of the character
8.5         USHORT usCode;        // base codeset code of the character
8.6         wchar_t wsInitial[3];// the initial sound of the character
            wchar_t wszFinal[7]; // the final sound of the character
8.7         ULONG ulOffsetWords;  // pointer to words beginning with this char 8.8     Component Table: array of structure Component Structure Component:
8.9         UCHAR ucStrokes[12]; // Stroke composition Info
8.10        ULONG ulComponent;   // the first drawn component 8.11    Word Table: array of structure Word Structure Word:
            array of ULONG word[];// code of the words
8.12        ULONG ulWordFreq;     // high bit is set + Word Freq.

8.13    Component Frequency Table:
            array of ULONG ulFreq;// size in: total number of components 8.14    Complex Component Frequency Table:
            array of ULONG ulFreq;// size in: total number of components 8.15    Stroke Match Buffer: UCHAR ucStrokes[12];

8.16    Letter Buffer: array of char cLetters[];
```

FIG. 8

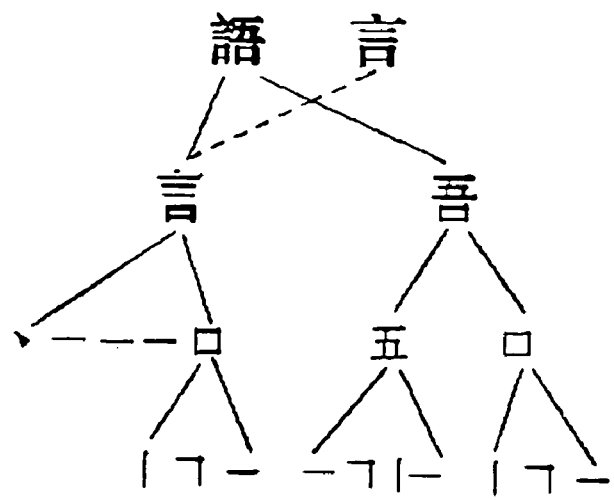
Start:
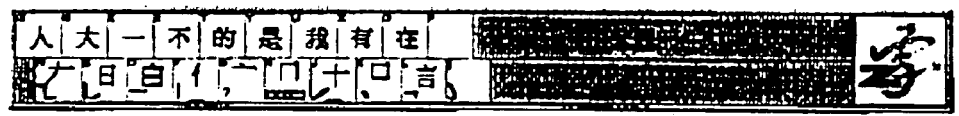
Step 1: shift L
Step 2: D
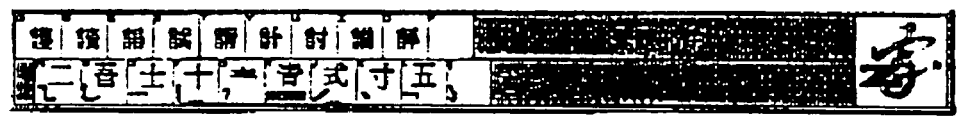
step 3: E
step 4: shift L
step 5: Y
FIG. 9

METHOD AND APPARATUS FOR CHINESE CHARACTER TEXT INPUT

FIELD OF THE INVENTION

The present invention relates to input of Chinese character text using systems and apparatus such as word processors, computers and other similar devices.

BACKGROUND OF THE INVENTION

Several modern languages are written with scripts that utilize symbols known as Chinese characters. These symbols, which are also known as Han characters or ideographs, originated in China several thousand years ago. In the modern languages which use the symbols, the literal designations for "Chinese characters" vary, such as Hanzi (Chinese), Kanji (Japanese), and Hanja (Korean). The "modern" forms of the Chinese characters have been in continuous use for more than 15 centuries. Earlier forms were in use more than 30 centuries ago.

The major languages that today utilize Chinese characters in their writing systems are Japanese, Korean and the numerous dialects of the Chinese language family (such as the more well known Mandarin or Cantonese). The Japanese and Korean languages share no common linguistic roots with the various Chinese languages, but Chinese character symbols were borrowed from the Chinese writing system and adapted to the Japanese and Korean systems when these were developed several centuries subsequent to the development of the Chinese system.

Virtually all of the spoken Chinese languages have evolved in the presence of the well refined Chinese writing system that has been in continuous existence for several millennia. The writing system and the spoken languages evolved together, each constraining in certain ways the evolution of the other. In the case of Japanese and Korean, however, the spoken languages evolved to something close to their present form without a writing system and completely independent from the evolution of Chinese languages.

All languages have fundamental units called words although what precisely constitutes a word in a particular language is often a subject of debate. In most writing systems, space is used to separate words. This practice of separating words with spaces makes the word boundaries very clear. In the Korean writing system that uses Chinese characters, this practice of spacing words is also used. However, in the Chinese writing system there is no space between words and the distinction between words and phrases is less clear.

Orthographies (i.e. writing systems) generally incorporate a combination of the following elements—(1) a symbology for writing the spoken words of the language, (2) a symbology for the punctuation of language elements, (3) a symbology for writing foreign words, and (4) a symbology for non-word symbols such as currency signs, trademarks, etc. The writing systems of English, Chinese, Japanese and Korean all contain these elements.

In the Chinese writing system, each Chinese character corresponds with a syllable of the spoken language. Words, however, may be comprised of one, two, three or more characters, and each character represents a separate syllable in the spoken form. Chinese words are often referred to as character compounds or phrases because of the sometimes blurry distinction between words and phrases.

Most of the spoken Chinese languages have evolved through the millennia to the extent that they are mutually unintelligible. Monolingual speakers of the Cantonese dialect, for example, cannot understand the spoken Mandarin dialect any more than they can understand English. The dialects, in essence, are completely different languages that merely share common roots. All of these Chinese languages, however, have evolved through the centuries in coexistence with a common system of writing with the principal of a correspondence between syllable and character. While literate Cantonese and Mandarin speakers may read characters with different pronunciations, they can achieve a common understanding of each others writings because Chinese characters symbolize a meaning independent of their phonetic enunciations. Of course the common understanding is tempered by differences in grammar and literary style which influence comprehension.

In addition to the method of writing Chinese words exclusively in characters, Chinese writings also contain several punctuation elements and many characters which act as modifiers. Foreign words are generally written in characters that are read with a similar Chinese "sounding" to the foreign word. Because these sounds are different in different dialects, written words formed in this way will not usually have the same properties as ordinary Chinese words.

In the Japanese and Korean languages, both of which adapted Chinese characters for their writing systems, the correspondence between syllables and characters is not universally present. A single Chinese character may be read as a multiple syllable Japanese or Korean word. Both written Japanese and Korean are mixed systems that use both Chinese characters and phonetic symbols developed uniquely and independently by the Koreans and Japanese. For example, a Chinese reader who does not understand Japanese may recognize a considerable fraction of the Chinese characters in written Japanese and have some clues to the meaning of the Japanese text, but not much beyond that. A similar situation exists with Korean with respect to both Chinese and Japanese.

The phonetic symbols in Japanese are a syllabary of sounds of spoken Japanese and are called Kana. Each symbol in the Kana is a complete syllable. This is possible because of the relatively small number of different syllables in Japanese. Kana may be used alone as words in conjunction with Kanji (Japanese use of Chinese characters—see page 1, supra) or as modifiers to other words written in Kana or Kanji. It is also possible to "romanize" the Kana by writing the Kana themselves with latin letters. Thus, written Japanese is a mix of Kana and Kanji with various words written in one, the other, or both.

The phonetic symbols in Korean are called Hangul. Hangul represents syllables of spoken Korean written as a composite symbol built from several phonetic components assembled inside an imaginary square block. Rather than writing a syllable as a linear sequence of letters, Hangul elements are combined into one composite symbol confined in the square block that represents a syllable of spoken Korean. Like Japanese, Korean writings can be a mix of phonetic Korean symbols and Chinese characters called Hanja (see page 1, supra). Unlike Japanese, much of ordinary Korean text avoids the use of Hanja, and Korean script is usually entirely phonetic.

While Chinese is always written with characters, phonetic systems have been developed to aid in the pronunciation and teaching of Chinese characters. Among these systems are the Chinese phonetic alphabet (also known as BoPoMoFo) which has become the standard phonetic system in Taiwan, and the Pinyin romanization which has become the standard phonetic system in the People's Republic of China. Both of these systems have been widely used for decades as an adjunct to teaching Chinese language and writing, but neither system functions as a writing system by itself. The Chinese phonetic systems have, however, been adapted as means of inputting Chinese characters into computers. Representative examples are described in U.S. Pat. Nos. 5,212,638 and 5,360,343.

Chinese Character Properties

Chinese Characters are orthographic symbols of several basic types which include pictographs, indicatives and various compound forms. Pictographs are essentially pictures that are often abstracted. Indicatives are form directions suggestive of meaning. The various compound forms include combinations of at least two pictographs or indicatives that together suggest a meaning. Other compound forms include those with elements that relate to the pronunciation and sound associated with the character. Such characters with phonetic elements are by far the most numerous.

There are many thousands of Chinese characters. The 2nd century dictionary by Xu Shen listed approximately 10,000 characters. Approximately 50,000 Chinese characters were cataloged in the seminal 18th century "Kang Xi" dictionary compiled by Kang Xi and his associates. Today, the majority of "fully" literate Chinese know a few thousand characters. These several thousand characters are used to write the tens of thousands of words used in modern Chinese writing.

Chinese characters are drawn by brush, pencil or pen from a repertoire of about 30 basic strokes. The complete character is drawn within an imaginary square box. Characters can vary from a single stroke to more than 30 individual strokes. From the 30 basic strokes, there are many variations according to size and position.

The more complex characters (which are the majority of all characters) are normally comprised of several sub-units where each sub-unit is a smaller or abstracted version of other characters. These sub-unit structures allow the Chinese to realistically deal with the thousands of characters available for writing. Most characters consist of 2, 3 or 4 sub-units from a set of only a couple of hundred basic sub-units. The 18th century Kang Xi organized characters using 214 of such sub-units which are referred to as "radicals" in the West. Characters are often related to each other through these sub-units some of which may indicate meaning (quite universally) or sound (in some dialects which may no longer be spoken). The radicals of a particular character are typically drawn as individual units. There are cases, however, where the drawing sequence is interrupted, for example, when a radical is drawn within another enclosing subunit.

In typical Chinese text, the frequency of occurrence of a particular character has an exponential distribution as shown in Table 1.

TABLE 1

| Most Common Characters | Accumulated Frequency |
| --- | --- |
| The first one | 4.0% |
| Top 100 characters | 39.99% |
| Top 500 characters | 75.86% |
| Top 1,000 characters | 89.12% |
| Top 2,500 characters | 98.49% |
| Top 5,000 characters | 99.89% |

Machine Input for Chinese Characters

The earliest known systems for the machine input of Chinese characters relied on arbitrary codes. For example, the Chinese telegraph code defines a selection of 9999 characters using a 4 digit numeric code. A highly trained individual would essentially memorize the entire coding of characters and key in the corresponding code. A distinct advantage of code based systems is that they readily allow blind operation, i.e. an operator that has learned the code can enter characters without removing his eyes from a source document, much like an accountant with an add-punch machine. The problem, of course, is the difficulty remembering such a massive set of code numbers. When the code for a character is not immediately known to the operator, a dramatic reduction in throughput results because of the need to consult some sort of reference.

The characteristics of latin-based writing systems are such that it was relatively easy to create a typewriter key system with one key for each of the 26 letters. The transition from manual typewriting devices to keyboards for computer input was a simple adaptation. In the case of Chinese characters, however, the need to accommodate the many thousands of characters has been problematic. For instance, U.S. Pat. Nos. 2,950,800, 4,379,288 and 4,951,202 describe specially designed machines and keyboards in attempts to establish a comparable means for encoding Chinese characters.

Another approach to entering Chinese characters is to use an intermediate system based on the sounds of the characters in the local language. In the case of Putonghua, the standard dialect of Mandarin Chinese within the People's Republic of China, there are about 400 distinct syllables if one ignores the tones. There are, thus, many characters with essentially the same sound, and there are also difficulties in distinguishing many of the sounds for those with an active dialect that is different from Mandarin. There exist also many cases in which the forms of rarer characters are known to an individual, but the pronunciation is not. Despite these difficulties, phonetic systems are presently the most popular forms of input and retrieval of Chinese characters for computer users. Representative examples are described in U.S. Pat. Nos. 4,500,872, 4,937,745, 5,255,189 and 5,319,552.

Attempts to adapt the western "QWERTY" keyboard to implement coding of Chinese characters are also known such as described in U.S. Pat. Nos. 4,684,926 and 5,187,480. A practical system for entering the thousands of possible Chinese characters without resorting to massive keyboards and new machines, complex and intricate systems for adapting western keyboards to Chinese character input by providing printed legends to replace the 26 latin letters, and the use of phonetics and intricate analog codes, would be a substantial benefit to those that require the use of written Chinese characters.

U.S. Pat. No. 5,109,352 describes call-up of characters based on (1) a classification of the basic strokes into a relatively smaller number of basic categories and (2) sequential entry of the stroke categories in the conventional order in which they are written. According to the teachings of the '352 patent, the number of strokes required to produce the desired character can be large. Although the order for writing strokes are consistent, significant differences do exist. For characters with a large number of strokes, the probability of a particular operator getting all of the strokes correct can be quite small. As the '352 patent teaches, storing alternative codings of the strokes for characters can mitigate these errors. This approach, however, if applied too frequently can reduce the effectiveness of the system by resulting in less uniqueness.

Additionally, an operator who does not know the proper order and classification for a particular character must resort to the awkward and time consuming process of trial and error. This can dramatically slow the overall average rate at which characters are inputted. This is particularly true for many situations where there is uncertainty in more than one stroke resulting in several possible permutations and combinations. In this case the operator may be "stuck" and be forced to consult a reference.

Another approach to the problem of entering Chinese characters are systems based on the use of radicals (as defined on page 7, supra). Two such systems are described in U.S. Pat. Nos. 5,119,296 and 5,197,810. These systems are based on decomposition of characters into their constituent structures, classification of radicals according to some rules or relations, and assignment of fixed locations on the keyboard for each radical, typically on multiple pages.

Such systems using radicals all have relatively complicated coding systems, rigid rules and inflexible keyboard assignments and often organized into the, above-noted, multiple pages. The radicals are normally drawn from the original 214 radicals of the Kang Xi dictionary, suitably modified to account for the simplification of certain characters that has occurred in the People's Republic of China. These radicals, designed as they were for the purpose of classification of characters, do not include all of the significant sets of forms drawn normally as a group. These factors make such systems difficult to learn and awkward to use.

None of the systems described in the prior art possess a completely satisfactory combination of ease of use, ease of learning the system and overall speed of text entry. A need exists in the art for a simple reduction of the massive nuances presented with constructing Chinese characters and their input into modern machines for today's users. The following objects are a solution to these unresolved problems still existing in the art.

SUMMARY OF THE INVENTION

The primary object of the present invention is to provide an improved method and apparatus for inputting Chinese character-based text into machines with minimum training and learning time, high efficiency and the elimination of the need for external references.

Another objective of the present invention is to retain the "word nature" of Chinese text by delivering completed words to the intended machine to facilitate the further "word processing" of Chinese text by retaining the operator's concepts of words as they are entered.

Another object of the invention is to permit the continuous improvement or adaptation of the input system to the user or group of users by adopting words and character frequencies as actually used over time.

A further object is to provide a system which uses components as a substitution for sets of strokes and as a means for finer discrimination of character candidates.

Another object is to provide a system which uses the order for the display of next drawn components based on the cumulative frequencies of all of the possible characters given the previous stroke and component selection for which that component is the next drawn component.

Yet another object is to provide unique features for a Chinese character input system such as the elimination of the need to type a space between Chinese words, use of an input means with keys requiring no printed legends, and specialized virtual keys such as the "more" and "wild card" keys.

In the present invention, the operator and the apparatus form a closed loop feedback system. The operator reacts to visual information produced by the system and supplies additional data and decisions through keystrokes or other means. The reactions of the operator are largely a function of the operator's knowledge about Chinese characters and the words of a language written with Chinese characters. The apparatus reacts to the operator's data with additional information. In addition, the specific behavior of the apparatus in future operations is altered as the result of input by the operator in previous operations.

The system may incorporate either a standard keyboard or a touch-screen implementation as its primary input device. Most of the operations of the apparatus are common to either input device. In addition, the keyboard may be one handed to two handed. The two handed keyboard is most appropriate for high speed composition operations. The one handed keyboard is appropriate for transcription operations where one hand may be more efficiently occupied as a place holder on the source text. When adapted for input with a touch-screen device, the touch-screen replaces the keyboard as the primary input device and selections are made by pressing a stylus or finger on appropriate areas of the display providing the functional equivalent of a key press.

The input means can consist of a conventional keyboard, e.g. that found on a typical computer or typewriter. The traditional printed labels on the keys of the conventional keyboard are irrelevant in this invention and may be blank or dedicated to some other use such as the entry of latin letters, BoPoMoFo letters, Kana syllables or uncomposed Hangul elements.

The preferred embodiment relies on a tactile bump on the keys to orient the finger of the right and, optionally, left hand to the keyboard. The elimination of the need for key legends also eliminates the need for the operator to move his or her eyes to the keyboard with the possible exception of initial hand placement. In the preferred embodiment system, 8 digit fingers are positioned on the home row where each finger corresponds to the key assigned to one of 8 strokes categories. The thumbs remain free to operate the space bar and the little fingers of each hand are also positioned to easily operate the shift keys. This is a distinct departure from the prior art for Chinese character input. This typing position allows users to type the stroke categories at high speeds using only the home row keys. Operators can become accustomed to this layout just by using the system without separate (expensive and time consuming) typing lessons.

The invention includes display means of which a portion is devoted, when appropriate, to interactions between the operator and the apparatus for the purpose of inputting Chinese characters. The display may overlap other information being displayed when the focus of activity involves Chinese character text input. For example, the display information related to the invention may overlap a text processing application which uses the Chinese characters produced through the use of the inventive system. The invention includes means for imaging on the display any particular Chinese character in the supported character set, set stroke classifications represented by an abstract symbol, and the components of Chinese characters.

The system contains programmed data processor and storage means which provides the facilities to perform, with rapidity, the steps required by the input/feedback process steps of the invention. The invention makes use of data stored within storage means which includes data related to the properties of individual Chinese characters, data related to the properties of individual Chinese compounds (i.e.

words and phrases), and data related to the component parts of Chinese characters. The character properties include—(1) the identification and order of the strokes used to draw the character, with the strokes being in accordance to a selected classification scheme, (2) the frequency of occurrence of the character as the first character of a word with respect to the operator's language, (3) the orthographic components of the character in drawing order, and (4) indicators of the character's membership within various subsets of all Chinese characters, e.g. the simplified Chinese characters, the traditional Chinese characters, the Japanese characters, the Korean characters, the primary school set of simplified Chinese characters, the traditional characters which have corresponding simplified forms, the vulgar characters or an arbitrary set of characters.

The data related to the properties of Chinese words includes—(1) the frequency of occurrence of the word with respect to the user's language, and (2) indicators of the word's membership within the various subsets of all Chinese words, e.g. the set of conventional Putonghua words, the set of place names, the set of person names and the set of vulgar words.

The characters may be internally coded by any arbitrary coding system and converted to the desired external code by traditional code conversion techniques such as table lookup. In the preferred embodiment of the invention, the entire set of characters that are supported are stored internally by ordinal number of a "Character Table" and converted to any one of a variety of standard external 16 bit codes through table lookup.

When the mode for the input of Chinese Characters is invoked, the system displays a virtual representation of the key portion of the keyboard as illustrated in FIG. 5. This includes the home row on which the fingers are placed and the row above. This is the optimal position for high speed typing. It should be noted that in this optimal position the fingers are obscuring the key legends on the physical keyboard. The proper positioning of the fingers is confirmed to the operator through the bumps on the keys where the index fingers rest. This eliminates the need for fixed legends printed on key tops.

Display devices pursuant to the present invention provide an indication of which stroke keys are assigned to each finger. These assignments are fixed so that the operator will learn the fixed association and be able to gain proficiency in typing a stroke without conscious thought. The fixed stroke assignments are displayed in a corner of the key image that appears on the display. For touch-screen devices the strokes are displayed and may be entered by pressing the stroke image. Alternatively, a stroke may be entered by drawing it in a box provided for that purpose.

The operator types the strokes of the character one by one. As each stroke is entered, the accumulated strokes are displayed in an input area. The strokes are actually abstract categories of strokes. In the preferred embodiment of the invention, 29 basic stroke types are placed in 8 stroke categories as illustrated in FIG. 1B. Alternative schemes may be employed with smaller or larger numbers of basic stroke types or stroke categories.

As each stroke is entered, the display of character candidates will change to display the most frequent characters that begin with the sequence of strokes as entered. When the desired character appears, the operator merely selects that character, i.e. the key on the display keyboard containing the desired character's image. The operator can type the corresponding key, without looking at the keyboard by using the learned association between fingers and strokes, and the relative position of the key with the desired character with respect to the nearby key with the stroke.

The display provides a set of character candidates that may be directly selected by painting the character images within the key images. In the preferred embodiment of the invention, these are provided in the row above the home row. The operator may select one of these characters by simply typing the corresponding key. The eyes may (and optimally should) remain on the display. The operator is guided by the relative positions of these keys to the home row. Up to 10 character candidates may be displayed. In the preferred embodiment of the invention, the operator may configure the number of characters displayed from 5 to 10 and the order in which characters are displayed, e.g. left to right, right to left, or center out. While a left to right order with the maximum number of candidates may appear obvious to westerners, the center out option reflects this discovery that many Chinese operators prefer a center out order with a smaller number of candidates because of their ability to quickly recognize characters with a small cluster of characters.

In the preferred embodiment, a "more" key 47 is provided on the home row as shown in FIG. 5. The more key causes the display of the next most frequent set of candidates. The display image for the more key includes a set of tick marks 49 that indicate how many groups of characters beginning with the entered stroke sequence are still available. This allows the operator to choose whether to enter an additional stroke to limit the number of candidates or, alternatively, to simply page through the groups with the "more" key. Each of the "tick" marks corresponds to a group of candidates.

The preferred embodiment of the invention also includes a "wild card" key 46 that substitutes for any of the strokes. This feature is highly useful for situations where the operator may not know or may be unsure of a particular stroke's classification under the system or the exact order of a particular subset of strokes. Writers of Chinese are usually certain of what constitutes a stroke, i.e. they will rarely substitute one stroke for two and visa-versa.

Another feature of the preferred embodiment of the invention is the display of "Last Chance" characters ahead of their normal frequency order. In most cases the simplest components, i.e. those with only a few strokes, are also the most common. There are several notable exceptions, however, where a character of a few strokes is more rare than many other more complex characters that begin with the same sequence of strokes. This is particularly true where the supported character set includes components that are rarely used as stand-alone characters in common text. Additional strokes cannot be entered at this point because the desired character has no additional strokes and any stroke entered would disqualify the desired character as a candidate character. This is handled by a feature which presents characters which match all the strokes that have been entered ahead of the others so that they will always be before the operator. These may be displayed on the first group of candidates or beginning with a specified page (i.e. group of characters shown with the "more" key). It should be noted that at this point the operator knows that he has entered all of the strokes for this character and consequently knows that he may have to page with the "more" key to get to the character.

The present invention employs the novel use of components as a substitution for sets of strokes and as a means for finer discrimination of character candidates. This feature is particularly useful for complex and/or rarely used characters. The set of components are arrived at by analysis of all of the Chinese characters in the particular supported Chinese character set as to their component structure and the order in which the components are drawn.

FIG. 2 provides the images and stroke sequence for a selection of the characters in the preferred embodiment of the invention. The orthographic components used uniquely herein are not identical with the commonly known "radicals" (see page 7, supra.) although both share some similarities. The first drawn component of a character is not necessarily the most important component and not necessarily related to the single radical under which the character is conventionally classified for dictionary purposes. In other words, the decomposition of characters into components and component sequences is based on the way characters are drawn and not on the way they appear in completed (or printed) form. In addition, the components are completely orthographic and different for forms drawn differently. For example, the "man" radical has different forms when drawn on the top of the imaginary square than from when drawn on the side. The former consists of the left and dot (right) sloping strokes $\lambda$ and the latter of the left and down strokes $\tau$. These are distinguished as two separate components.

Components themselves may also have a structure, i.e. a component may itself be composed of other sub-components or of another component with one or more additional strokes. As the terms are used herein, a component that is comprised solely of the fundamental strokes is referred to as a "Simple Component" and a component which is itself comprised of other sub-components as a "Complex Component." FIG. 3 provides a representative sample of Complex Components which are composed of other subcomponents also illustrated in FIG. 2.

According to the present invention, the order for the display of next drawn component candidates is based on the cumulative frequencies of all of the possible characters (given the previous stroke and component selection) for which that component is the next drawn component. The system determines this order by accumulating the sum of the frequencies for each component from each character that qualifies as a candidate (in accordance with the previous stroke and component selections). By computing the cumulative frequency of every component used in every character possible with the current stroke and component sequence the system is able to provide the most likely components that can lead to the desired character. This is a significant advance over the prior art which relies on fixed arrangements for radicals.

In the preferred embodiment of the invention, the component candidates are displayed within the image of the home row keys. A component candidate is entered by holding one of the shift keys before pressing the key corresponding to the component image. Additional components are displayed when the "more" key is pressed and the number of additional components is indicated with tick marks in the "more" key image similar to those for characters. Alternative mechanisms can be used, e.g. display of character candidates within the home row and components when the shift key is held down.

When a user selects a component, the component replaces the strokes, if any, that have previously been entered in the input area. The character candidates will now be only those characters for which the component is the first drawn component or another component for which the selected component is its first drawn component. By selecting a component, the number of matching candidates is dramatically reduced. This is because while very large numbers of characters may share the same first few strokes, the number of different components is much larger than the number of different stroke combinations. The combination of one or two strokes followed by a component selection effectively discriminates the characters from one another. For example, after three strokes there may still be hundreds of characters which match these three strokes as well as tens of components. But by selecting a component, the candidates are narrowed to only those with that first drawn component. This selection provides a much smaller list of candidates than that which would result by entering another stroke. In addition, there are many characters for which the first drawn component consists of many strokes. Using strokes alone, these characters cannot be further distinguished from one another until all of the strokes of that component have been entered. By selecting the component, the strokes which follow the component will be able to distinguish characters without the need to enter all of the strokes for the component (in proper order). This has the desirable effect of dramatically reducing the total number of keystrokes that have to be entered, particularly for the less frequently used characters.

Another feature of the invention is associated with the compound nature of components, i.e. the fact that some components include other components. In the preferred embodiment of the invention, once the operator has selected a component, the system determines all of the components (if any) that incorporate the selected component as their first drawn component. These are displayed ahead of the components that are the likely next components of characters and distinguished by color or other indicator. The order for display of these larger "including" components is based on the cumulative frequency of the characters for which the larger including component is the first drawn component.

After selecting a component, the operator will generally have the choice of (1) selecting the character if it now appears, (2) selecting a larger including component for the first drawn component, (3) selecting the next component of the character (if the previously selected component is in fact the first component of the desired character), or (4) entering the next stroke. These choices are in addition to that of paging through the groups for additional candidates in any category (as indicated by tick marks on the "more" key). It should be noted that the typical Chinese user requires almost no guidance to be able use the system. Her knowledge of the structure and classification of radicals does not need to be at the level of a scholar and she does not need to learn a complex keyboard mapping or classification system for the radicals themselves. All the user requires is her knowledge of how to draw the characters and the ordinary repeated groupings of strokes as they are drawn.

Because the operator interacts with the system, her knowledge of the character she desires and its structure (particularly the order by which major component parts are drawn) facilitates the process. The operator will normally select the most appropriate (i.e. easiest or most straightforward) method of reaching the character based on the structure of the desired character modeled in her own mind. Because the system reflects the way characters are actually drawn (in the order of components, each component possibly consisting of a first drawn simpler component, and each component drawn with strokes) the system as a whole closely matches actual, manual writing of characters.

When the entry of components is followed by strokes, the candidates for characters, larger including components and next drawn components are constrained by the entered strokes. Each additional stroke will generally reduce the number of candidates in each category. In actual operation, the operator, with the desired character in mind, keeps her eyes on the display and provides the additional strokes or component selections until the character appears.

The use of the component feature pursuant to the present invention is an advance over prior known systems based on radicals and fixed assignments of keys for obtaining them. As used herein, the term "component" refers to orthographic components which are related to the way component forms are drawn rather than their meaning. They are not arranged to be accessed in a fixed manner, but "appear" in order of their usefulness as a consequence of beginning to type the strokes of a character. Nothing has to be learned or remembered to benefit from the efficiencies possible with the use of components as provided by this disclosure.

Once the user has entered a character, the character is held in a character buffer pending completion of the Chinese word, which will ordinarily be comprised of at least two characters. While most characters are themselves a word, the vast majority of modern Chinese words are composed of two or more characters. In the present invention, once characters have been entered, the character candidates are displayed in two sets. The first set is based on the limited subset of characters which are the next characters of words in an arbitrary sized dictionary. In the preferred embodiment of the invention this dictionary contains approximately 80,000 multiple character words, phrases, idioms, and proper names. As strokes or components for the next character are entered this list quickly narrows. The second set of candidates are identical to those that result when there are no previous characters.

In one aspect of the invention, the set of word associated candidates is displayed in red (FIG. 5, arrow 54) to distinguish them from the non-associated candidates which are displayed in black (FIG. 5, arrows 53). In other words, the word-associated character candidates simply precede the non-associated candidates but they are distinguished by color. In many cases there may be more than one page of word associated candidates. The "more" key thus functions as previously described to display the next set of candidates. The tick marks (FIG. 5, arrow 49) in the "more" key are also colored red and black such that the user has an immediate indication of how many more pages of word-associated and non-associated candidates remain. As strokes or component selections are entered, the list of word associated and non-word associated candidates are both narrowed. Because the number of possible words is a small fraction of the total number of characters, this list narrows quickly with each succeeding stroke or component.

The selection of a word associated candidate (displayed in red, arrow 54, FIG. 5) enters that candidate as the next character of the current word, if any. The selection of a non-word associated candidate (displayed in black, arrows 53, FIG. 5) provisionally begins a new word. This is provisional because in the preferred embodiment of the invention the operator has the option of defining a new word for the dictionary. Even though the dictionary may be very large, the new word may be a proper name or a technical term not found in the normal dictionary. If the user does not indicate the exceptional entry of a new word, the word-associated candidates will be those associated with the just entered character.

An additional feature of the invention is the elimination of the need to type a space between Chinese words. The operator may always type a space to explicitly indicate the end of the current word and deliver all previous words to the application (together with word separator characters if so configured). The user's typing of the space, however, is not required. The system buffers words in memory and displays the current word in red (or a color different from the color of the buffered words in memory). Selection of a non-word associated character (displayed in black, for instance) ends the previous word. The full words are delivered to the underlying application as the character buffer fills up or when explicitly requested by the operator by typing the space bar which signals completion of the current word and transfers all previous words, in order, to the applications.

Another feature of the invention is the ability to display candidates based not only on the selected strokes and components but also based on their pronunciation in Mandarin or Cantonese. With this feature, the operator is permitted to enter a roman or BoPoMoFo letter instead of a stroke. Caseless roman letters, as printed on the keyboard, are used to write in the Pinyin system as used in the People's Republic of China. BoPoMoFo letters, which are ordinarily printed on many keyboards used in Taiwan, are used to write the pronunciation of the Taiwanese phonetic system. These "letters" can be entered by using a control-shift or alt-shift in combination with a key containing the printed roman or BoPoMoFo letter. Use of other keys for the same purpose is well within the skill in the art. The roman or BoPoMoFo letter is thus entered in the input area and used to limit character candidates to those whose standard pronunciation begin with that sound. This feature provides yet another way to reach as a desired character where uncertainty exists in the stroke classification or sequence. Because of the way that component choices are displayed on the basis of the frequencies of potential candidates, the entry of a single letter can, in many cases, produce a relevant component and even eliminate the need for any strokes at all. Adding the rarely confused first stroke of the desired character to an initial phonetic letter will in most cases assure the display of a meaningful component if not the character itself. The invention will now be described in detail in conjunction with the drawings which are summarized below.

BRIEF DESCRIPTION OF THE DRAWINGS

FIGS. 1A-1C illustrate strokes and stroke classifications in accordance with the present invention.

FIG. 1A shows, separately, basic single stroke forms used in writing characters which are classified into 29 basic types, 8 stroke categories and 5 stroke categories.

FIG. 1B tabulates the correspondence between the 29 basic types with the reduced classification into 8 stroke categories.

FIG. 1C tabulates the correspondence between the 29 basic types with a further reduction to 5 stroke categories.

FIG. 2 tabulates a sample of Chinese character compositions, with arrow 2.1 designating the composite Chinese characters, arrow 2.2 pointing to simple components which comprise corresponding characters, and arrow 2.3 showing corresponding sequence of strokes.

FIG. 8 provides a representation of the principal data structures referred by the stored program associated with the present invention.

FIG. 9 shows, step-by-step, the successive displays through which a sample Chinese word is constructed.

DETAILED DESCRIPTION OF THE INVENTION

Figure 3:
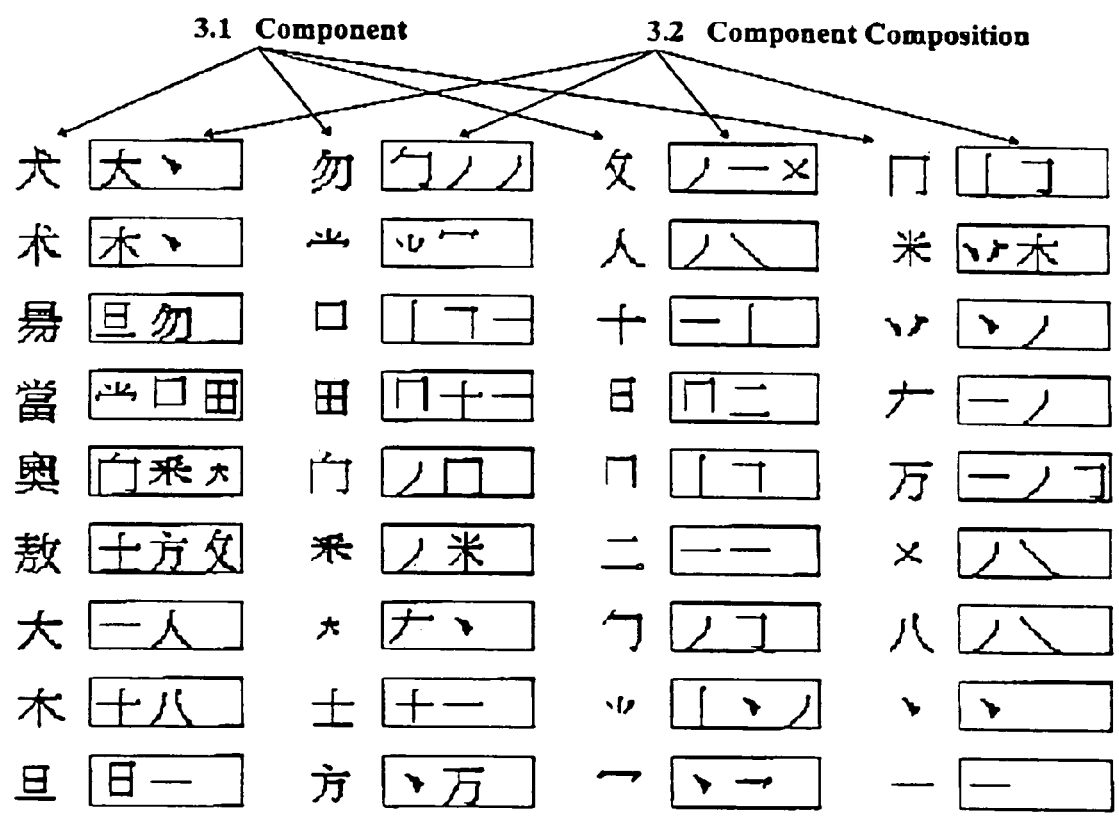
FIG. 3 shows a sample of complex components (designated with arrows 3.1) which are each comprised of corresponding subcomponents (arrows 3.2).
Figure 4:
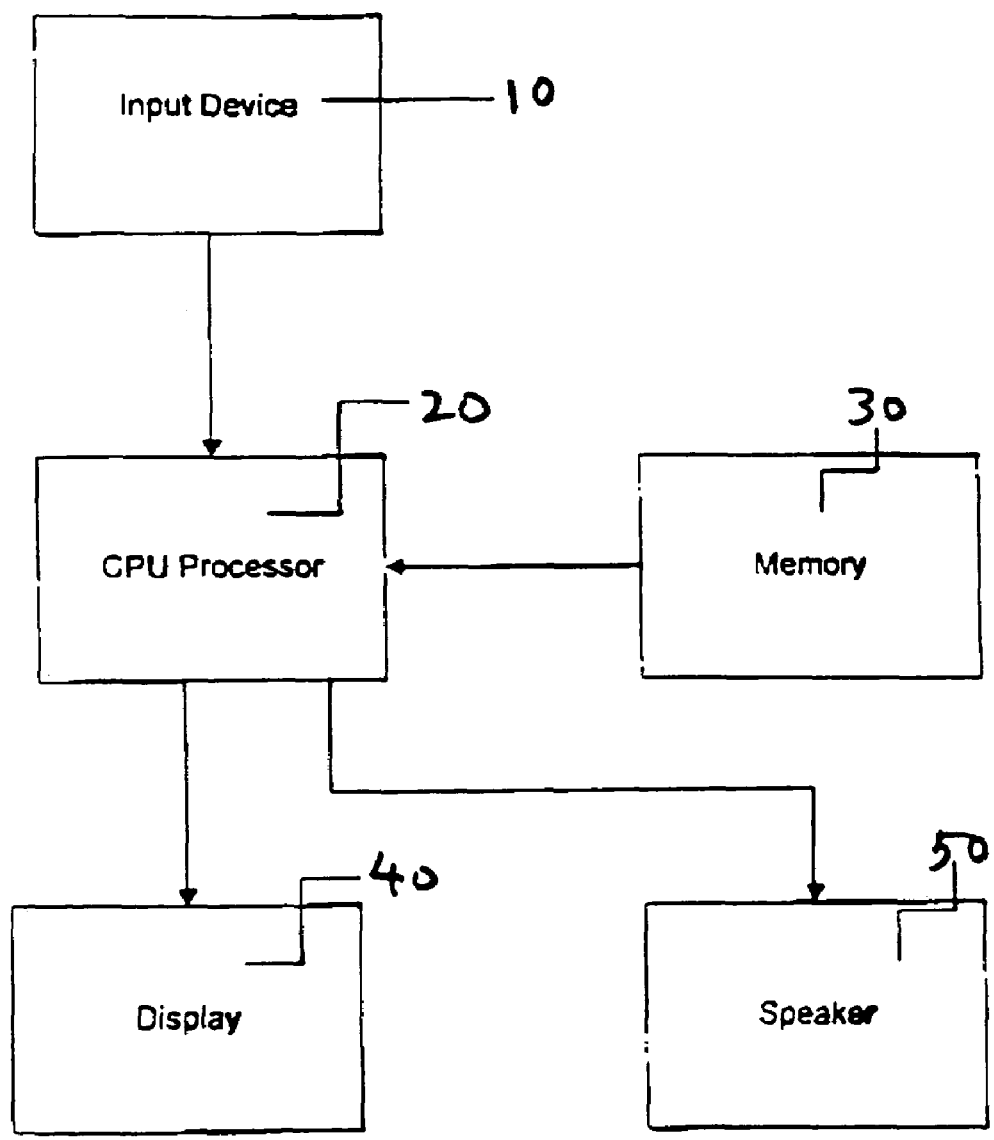
FIG. 4 is a block diagram showing integral parts of the apparatus used in conjunction with at least one aspect of the present invention.

FIG. 4 is a block diagram showing the integral parts of the apparatus used in conjunction with the present invention. The basic apparatus comprises input means 10 which may be a keyboard or a touch-sensitive, transparent x-y overlay of the display, processor means 20 which can comprise a conventional CPU that executes the instructions of the stored program in memory means 30 which is accessible to the CPU 20 which holds the data employed by the invention and used in intermediate calculations, and conventional display means 40 which consists of an all points addressable display such as a CRT, liquid crystal display or the like, and an optional audible alert means 50 such as a speaker for alerting the operator to error conditions. Variations to the specific items identified are known to those skilled in the art and can be interchanged therewith without departing from the scope of the present invention.

Figure 5:
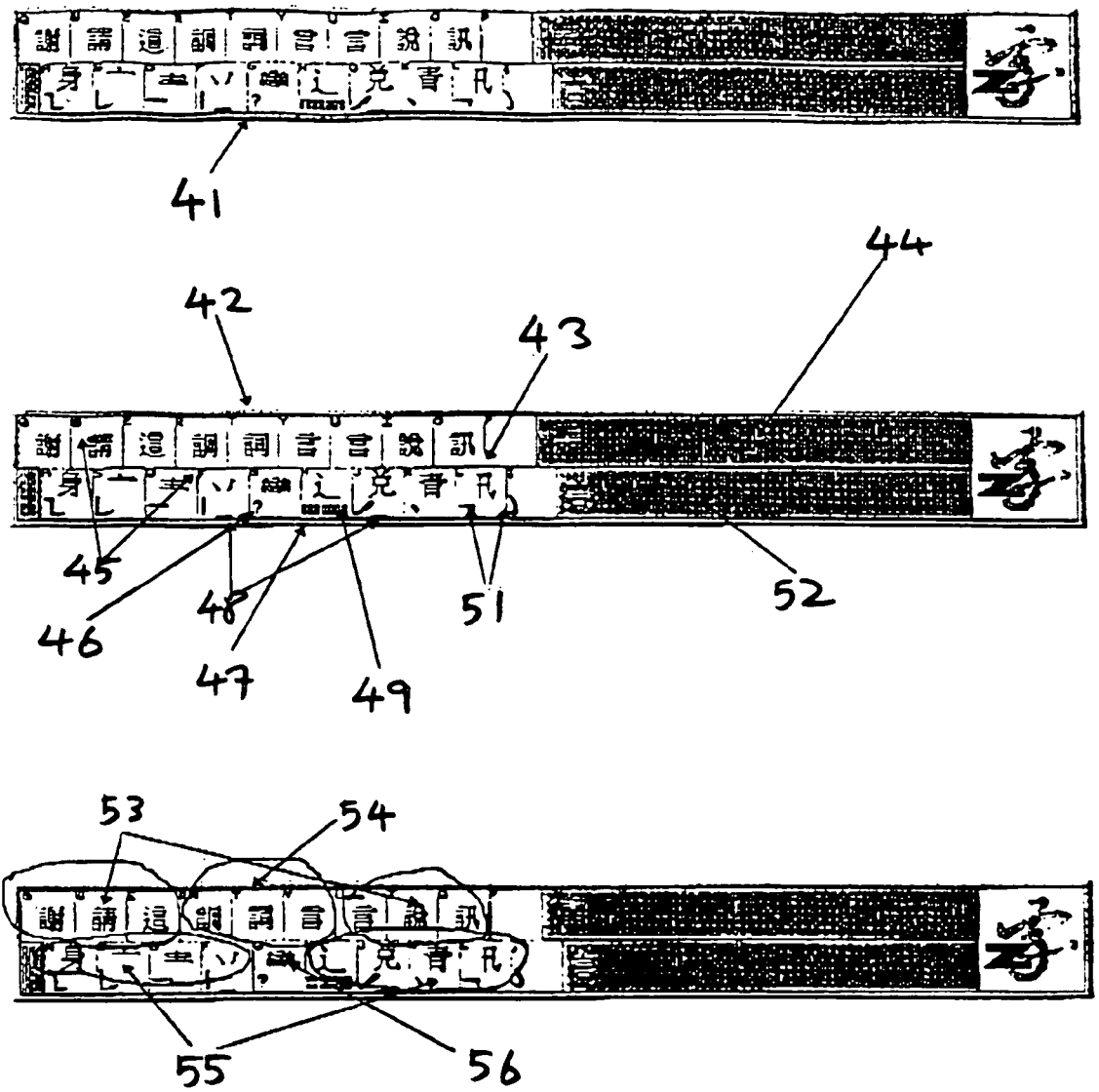
FIG. 5 shows a sample display layout such as for display 40 in FIG. 4. The display embodiment shown presents information to an operator using a two-handed keyboard as the input device.
Figure 6:
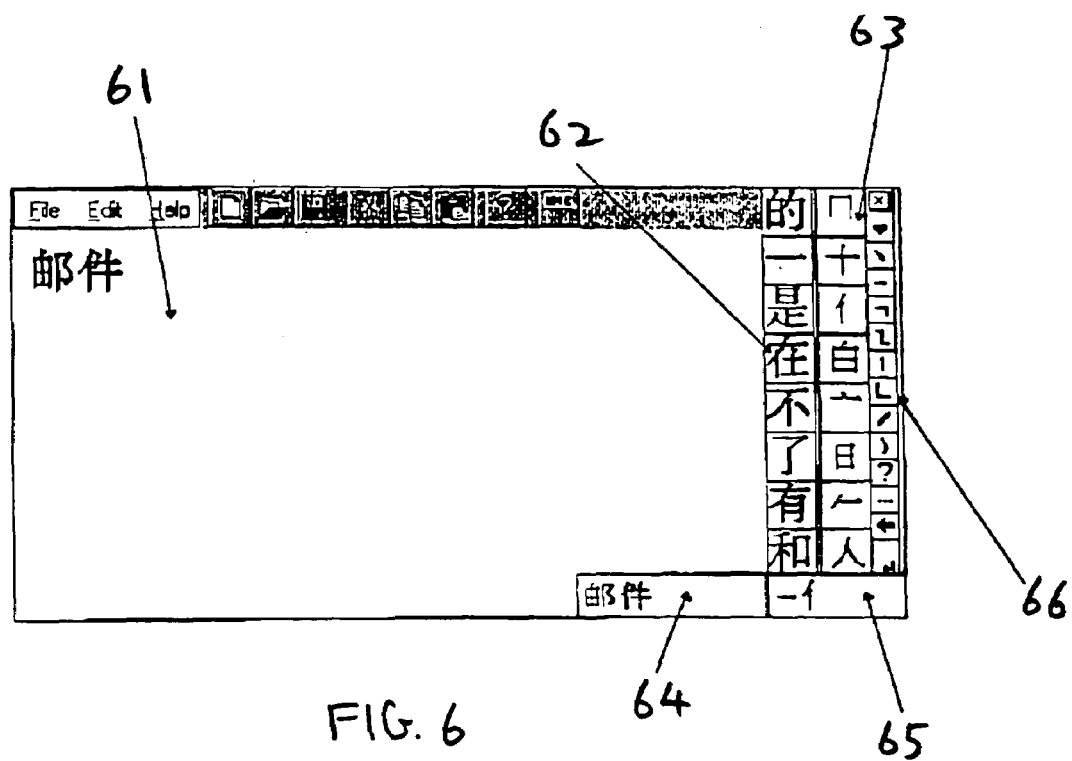
FIG. 6 illustrates a display with various areas for presenting information to the operator using a touch screen as the input means.

CPU 20 and memory 30 provide the means for executing a stored program that performs the detailed processing steps required by the invention. Memory 30 also holds the intermediate data required by the invention. In the preferred embodiment, information is displayed to the operator through the use of one or more overlapped windows such as illustrated in FIGS. 5 and 6. These windows are imaged on top of any underlying application, e.g. a conventional word processing program.

These display areas include a virtual keyboard area 41 shown in FIG. 5, with a layout that matches the layout on the keyboard means. An element buffer area 52 is provided for the display of the sequence of strokes and/or components that have been previously entered by the operator and a character buffer area 44 is provided for the display of previous characters selected by the operator. Alternate layouts may be employed e.g. those with separate windows or those where the characters, strokes and components are displayed in position within the underlying application.

The virtual, visual keyboard includes indicators 48 corresponding with the bumps on the home row of a conventional keyboard as a guide to aligning the fingers with the display. This eliminates the need to look at the physical keyboard. Small roman letters matching those imprinted on the physical keyboard may optionally be indicated.

The home row of keys contain small abstract representations of the strokes categories 51 that are assigned to the eight home keys, one stroke per key. In the preferred embodiment, the four central keys are assigned to the very familiar and most frequently occurring categories of "over", "down", "left" and "dot". The remaining keys and fingers are assigned to the other 4 stroke categories "over-down", "down-over", "over-down-over", "curved-hook". There is a one to one correspondence between keystrokes and fingers that allows the operator, with repeated use, to type strokes sequences rapidly. This includes both single strokes and more common sequences of two or three strokes.

The home row of keys also contains representations of components 43. The set of components displayed is a function of the previously entered strokes and/or components determined in accordance with steps described below. In an exemplary embodiment, the simple components are displayed in blue 55 and the complex components are displayed in green 56. The choice of colors is irrelevant as long as they are distinguishable from each other.

The operator enters a stroke by typing the key corresponding to the stroke. When operated with a touch-screen input means the stroke is entered by pressing an area of the display with the stroke representation or by drawing the stroke within a box provided for that purpose.

The operator enters a component by operating at least one of the two shift keys and then typing the key with the component image. When operated with a touch-screen input means the component is entered by pressing the area of the display with the component representation.

In the preferred embodiment, the home row also includes a key designated as the "wild card" key 46 in FIG. 5 which is shown labelled with a question mark. This key enters a "wild card" which serves as a place-holder for any stroke and is considered as matching any of the 8 stroke categories.

The display area for the upper row of keys 42 in FIG. 5 contains representations for the most frequent Chinese character candidates which match the sequence of strokes and/or components that have been previously entered. A character is selected by typing the key corresponding to the representation of the character. This is done by the operator through the visual relationship with the home row. For example, if the desired character appears on the first key the operator can immediately see that this key is above and to the left of the home key on which the left pinky finger is resting. This visual representation makes it unnecessary to move the eyes away from the screen. When operated with a touch-screen input means the character is selected by simply pressing the area where it is represented.

The character candidates which are associated as part of a compound word or phrase with any previously entered characters are displayed in red 54 and the character candidates that are not so associated are displayed in black 53 with all associated candidates displayed first.

In the preferred embodiment of the invention, a home row key is designed as the "more" key 47 in FIG. 5. Selecting this key will the cause the next group of candidates to be displayed. The representation for this key includes a set of tick marks 49 that indicate how many more groups of characters and components remain from the maximum number that match the previously entered characters, strokes, and/or component. These tick marks are colored to indicate the number of character candidate groups that include word-associated characters (54 red for example) or only non-associated character candidates (53 black). Similarly, the number groups with complex components (56 green) and only simple components (55 blue) are indicated.

With regard to the data structures used by the program associated with the present invention, this description refers to the various data elements as numeric storage locations. It should be understood that the actual storage for these numerical data elements will normally be organized as binary data convenient for manipulation by the particular CPU.

Referring to FIG. 8, the character table (8.1) is a data structure which contains a multiplicity of entries, one per character. The number of characters supported by a particular embodiment of the invention will depend on its particular area of application and will generally range from a few thousand to more than twenty thousand. In some cases a single character may have one or more duplicate entries in order to support cases where there may be several different stroke sequences for that character.

The character table is ordered based on the numerical frequency of the character in ordinary text. This numerical frequency is also stored as part of the character entry. In the preferred embodiment of the invention, the character frequencies may be altered as the result of the actual frequency of use of the characters by the operator. In such cases, the order of the table by frequency is always maintained. It should be noted that this frequency is not the relative frequency or order but the absolute frequency as a count of number of occurrences of the characters as first character of a word per N (variable) words.

Each character table entry includes the following data. First, the sequence of strokes are represented (8.2 in FIG. 8). In the preferred embodiment, each stroke category is assigned an arbitrary numerical value between 1 and 8 inclusive. The numerical value of zero serves as an end of the stroke sequence. The maximum number of strokes that need to be stored will generally be much less than the 36 strokes of the maximum length character. Only as many strokes as are needed to distinguish the character as one of a group of some maximum number is required. In the preferred embodiment, a maximum of 24 strokes is used.

Second, the first 2 components of the character are coded (8.3, FIG. 8). Each component is assigned an arbitrary numerical code. In the preferred embodiment, there are as many as 1,000 components. It has been discovered that it is not necessary to code more than the first drawn largest component and the second drawn component to distinguish characters into very small groups of characters.

Third, the character table contains the frequency (8.4, FIG. 8) of the character together with such other optional but useful information (8.5) regarding the character's properties e.g. its code value in one or more code set and its membership among one or more subsets of characters. It may optionally contain a coded representation of the sound (8.6) of the character which is used when the letters are permitted in addition to strokes and components.

Fourth, the character table contains a pointer (8.7) to an entry in a word table (8.11) that stores the words that may be formed with this character. The word table is described below.

A second major data structure is the component table (8.8, FIG. 8) which contains an entry for each component. Each entry contains the stroke sequence of the component (8.9) and the first drawn component (8.10), if any, of this component. Only one component is allowed. That component, however, may itself be composed of another component which may in turn be composed of another component in recursive fashion.

A third major data structure is the word table (8.11). In the preferred embodiment, the word table allows for several hundred thousand compound words (with at least two characters) and phrases. Approximately 80,000 words have been found to comprise a very substantial fraction of the Chinese words in ordinary use. The word table is a list of words with the first character of the word removed to save storage space. The first character of the word is implied as the word table is accessed through the character table which points to the all of the words that begin with that character. The one or more additional characters of the word are followed by a non-character code that also optionally encodes the frequency (8.12) of the word. The end of the words may be implied by the beginning of the words for the next character which is indicated by the next entry in the character table, again reducing the amount of storage required.

Figure 7:
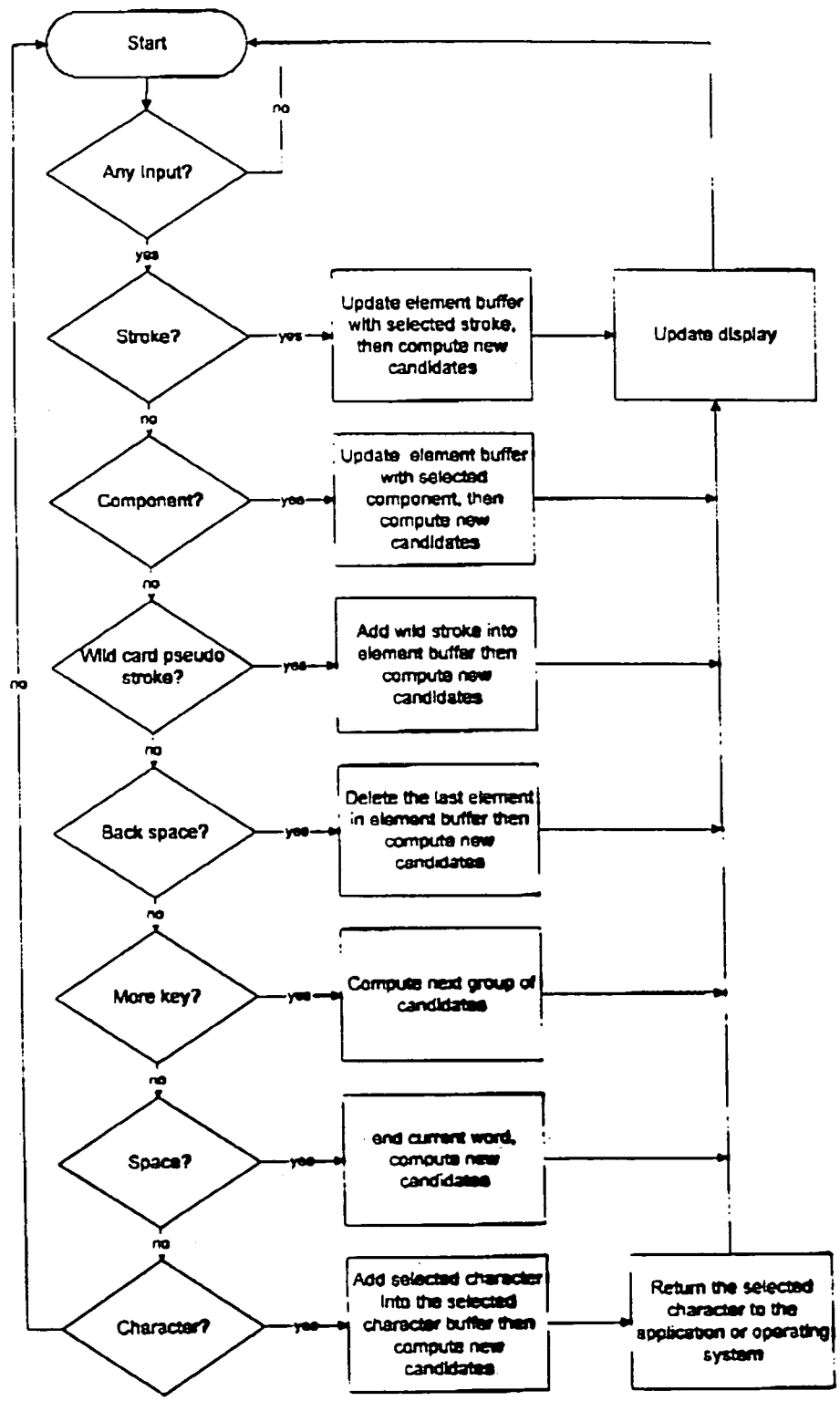
FIG. 7 is a flow chart of the high level steps in the stored program associated with the present invention, which are executed in response to an input selection for a character, a component or a special key by the operator.

FIG. 7 is a high level flow diagram showing the response of the system to the input from the user. In addition to the major data structures previously described, the program refers to a "character buffer" containing the previously entered characters of the current word, if any, an "element buffer" containing the components (if any) and following strokes (if any) previously entered by the user. Both of these are emptied when the program is initialized.

From the perspective of the stored program's operation, the input from the user is conceptually identical whether the input means is a keyboard, a touch-screen selection or other similar input means. In every case, the operator provides a character selection, a component selection, a stroke selection (including the wild card pseudo stroke), a "more" request, a "space", or a "backspace". The flow diagram in FIG. 7 shows the steps for each of these cases.

In the case of a stroke selection, the stroke is appended to the element buffer, candidates are obtained, and the displays are updated. The detailed steps for obtaining candidates are discussed below. In the general case, the candidates may be up to a predetermined maximum number of word associated character candidates, non-word associated character candidates, complex components, and simple components. The word-associated candidates will not be present if no previous characters are buffered. The complex component candidates will not be present if there is no previous selected component.

The "more" request causes the program to display the next group of candidates. A component selection causes the program to first determine if a complex component has been selected. If it has, then the previous components is/are replaced by the selected component and any subsequent strokes are removed from the element buffer. If the component is a simple component, then all strokes (but not components) are removed from the end of the element buffer and the selected component is appended. New candidates are then obtained and the display areas are updated. Note that as a result of this processing the element buffer can only contain leading components (if any have been selected) followed by strokes. Components can never follow strokes as the strokes are always removed when a component is entered.

A "character selection" causes the program to first determine whether a "word associated" character (displayed in red in the exemplary embodiment) or a non-associated character is selected. If a word associated character is selected, it is appended to the character buffer. If a non-word associated character is selected, a word separator is appended to the character buffer followed by the selected character. In both cases the element buffer is cleared, candidates are obtained, and the display areas are updated.

Note that as a result of this processing the character buffer may contain strings of words separated by a separator character. This is a feature of the invention which allows Chinese words to be properly distinguished so as to permit higher level processing at the Chinese word level rather than as sequence of single unrelated characters. As characters and words are assembled into the buffer in continuous fashion the program delivers whole words from the beginning of the buffer to the application. The program can be configured to deliver characters with or without the word separator depending upon whether or not the underlying application is able to deal with a separator character. This avoids the need to have to explicitly separate each word with the space bar or equivalent mechanism.

The "space" selection is used to signal the explicit end of the current word. In most cases, a character is a word and may also be the first character of a compound. The space signifies that the character is indeed intended alone as a word and is particularly useful in the cases when there are a great many words and phrases that begin with this character. Use of the space is usually an operator preference item as the normal typing of strokes and components will eliminate most if not all of the characters that are associated as a word and expose the desire un-associated character. The use of color or other distinguishing display characteristic reinforces the distinction as to whether the selection is continuing the word (red) or beginning a new word (black).

The backspace key essentially undo's the previous key by removing the stroke, character, or component from the appropriate buffer. Candidates reflecting the updated buffers are then obtained and the display areas are updated. In the case where the previous operation was a "more" key which caused display of the next group of candidates the previous group is restored without the need to obtain new candidates.

Figure 10:
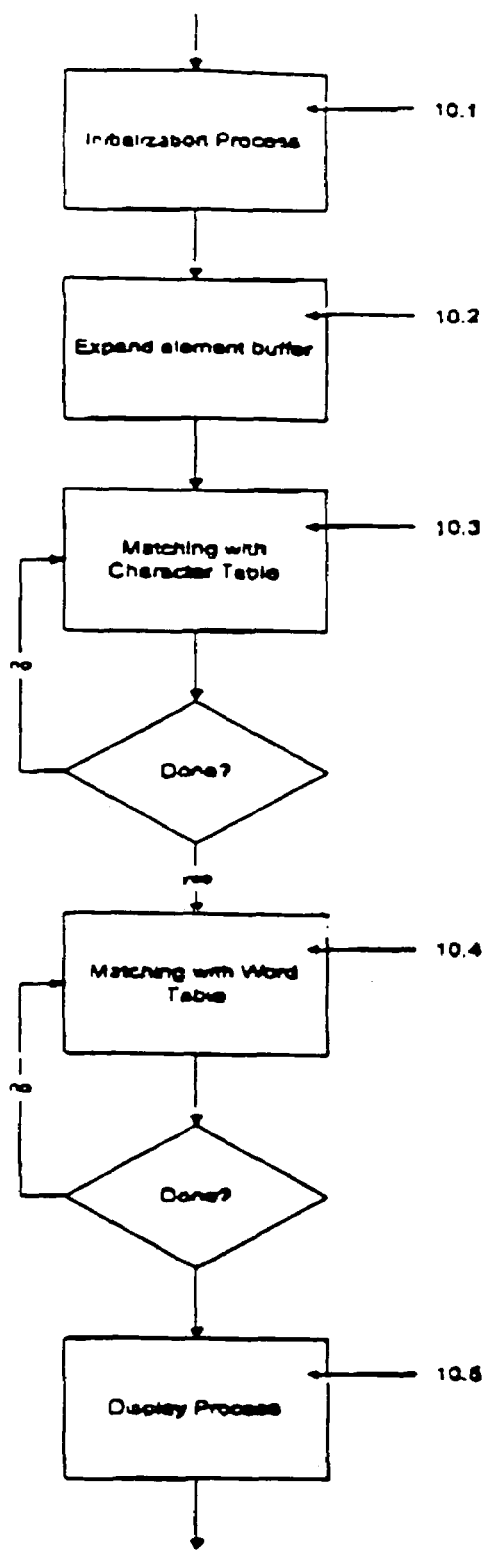
FIG. 10 provides a flow chart for the program steps associated with obtaining character candidates for Chinese word construction pursuant to the present invention.

The process of obtaining candidates has been described above. This process is at the heart of the operation of the invention and will now be described with reference to FIG. 10. As discussed above, the result of initial processing of the stored program and its data results in a state consisting of the (1) characters, if any, of the current word, (2) element buffer containing previously selected components and strokes and, optionally, roman or BoPoMoFo letters, and (3) current displayed group of candidates which is advanced with the more key. Obtaining candidates is always in the context of this state.

The first step of the process (10.1 in FIG. 10) is to clear temporary data-structures referred to as the component frequency table (8.13 in FIG. 8) and more complex component frequency table (8.14 in FIG. 8). These are each a table of N entries where N is the number of component codes. All entries are initialized to zero.

The next step of the process (10.2 in FIG. 10) is to expand any components in the element buffer into strokes. This is done by stepping through the element buffer and if the element is a component, consulting the component table for its stroke sequence and copying this to a "stroke match" buffer (8.15 in FIG. 8). On encountering a stroke in the element buffer, the stroke is copied to "stroke match" buffer. On encounter of a letter, the letter is copied to a "letter buffer." (8.16 in FIG. 8) At the end of this process, the "stroke match" buffer contains the stroke sequence for the desired character and the "letter buffer" may contain the letters corresponding to the sound of the character. The first and second elements of the unaltered element buffer may contain the code for a component if components were previously selected.

The next step of the process (10.3 in FIG. 10) is to step through the character table (8.1 of FIG. 8) to determine whether or not the character matches. Note that this character table is in frequency order with the first entry being the most frequent. A character is a considered match, i.e. a candidate, if all of the following conditions are true. First, every stroke of the "stroke match" buffer must match the corresponding stroke of the potential candidate. In this comparison, however, the wild card matches every stroke. Second, if the first position of the element buffer is the code for a component, then the first component of the potential candidate must match this component. Third, if the second position of the element buffer is the code for a component, then the second component of the potential candidate must match this component, and fourth if the letter buffer contains letters for the sounds of the character the letters must match the coded sound of the component. For these purposes, a component is considered a match when it is identical, i.e. the same code. It is also considered a match when the character's components is a complex component that includes this component as its first drawn component. Components consist of an optional component and additional strokes. If the component contains a component, then that component may also contain a component. This is recursive until the component does not contain a component, i.e. is a simple component consisting solely of strokes. The match is determined by proceeding through this recursion and checking if the component is a match until the component contains only strokes at which case the component is not a match.

If the character is not a match, the process proceeds to the next character table entry. If the character is an exact match for the exact number of strokes it is copied to an "exact match" list. If the character is an inexact match, i.e. there are more strokes for the character, the character's code is copied to the list of candidates. The exact matches are accumulated separately because they will be displayed first in the candidate list.

In addition, for the inexact matches, the frequency of the character is accumulated under the characters "next" component. Recall that each character has a first and second component. If the element buffer has exactly one component, the "next" component is the character's second component. If the element buffer has no components, the "next" component is the characters first component. The component frequency is accumulated by adding it to the previous value of the components accumulated frequency. In addition, the character frequency is accumulated for every component that is a component of this component. By performing this accumulation for every matching character, the accumulated frequency values will reflect the frequency of occurrence of each component in all the matching characters weighed by the frequency of characters in which they occur. By later sorting the components by these accumulated frequency the components can be offered in order of their probability of leading to the character. Note that components with zero accumulated frequency do not occur next in any of the matching characters. There is thus no need to offer them for they will not lead to the desired character. Note that if all characters in the set are matching characters (because no strokes have yet been entered) the components that are offered are also in order of the probability of their leading to characters. As the character frequencies are adjusted, for example to the actual frequency use of characters by the operator, the order in which components are offered automatically reflects these new character frequencies.

In addition to accumulating the components frequencies for the next component, the frequencies of "more complex" first components are accumulated when the element buffer has a single component. This is done only when the component of the character is not an exact match for the first component in the element buffer. Since the character is a match, the characters component and any other components that it is composed of which do not match the component in the element buffer represent more complex components. By accumulated their frequencies, these more complex components can be offered to the operator. This accumulation is made to the "complex component frequency" table.

When the entire character table has been passed there will be—(1) an exact match list containing the exact matches, (2)

the remaining matches in frequency order, (3) a next component frequency table with non-zero values for relevant components, and (4) a "more complex" component frequency table with non-zero values for any relevant more complex components. The component frequency tables are each further processed to produce an order list of component code component frequency values which is then sorted on the frequency. The component codes are then copied to form a frequency ordered list of components and frequency ordered list of more complex components.

The next step of the process (10.4 in FIG. 10) is to produce any word associated candidates. This step is performed only if the character buffer contains previously entered characters for the current word. The process begins with the first character of the word. The character is first looked up in the character table to locate the pointer to the character words. The process then steps through each of these words. For each word a check is first made that each of the subsequent characters in the word match any additional character of the current word. If they do not, then the process moves to the next word.

The next character in the dictionary word is used to access the stroke table for this character. A match is then performed to see if that character matches the strokes, components and letters. This match is identical to that detailed above. If the word is a match, then the character is added to the list of word associated candidates. Before the word is added, however, a check is made to insure that the character is not already in the list and if so, it is not added. When the process has stepped through each word, the resulting list is the list of word associated candidates.

The display process (10.5 in FIG. 10) will update the character and component candidates. The display will often have more candidates than can be shown at one time. Those that are shown depend on how many times the more key is processed. A counter keeps track of which group is to be displayed.

The order of display is first (the word associated candidates which are in red, for example); next is the exact match candidates; and, finally, the character candidates. For the component display the order is, first, the more complex components painted in, for example, green followed by the next components painted in blue.

While this invention has been described in conjunction with the embodiments recited above, it is understood that the invention is capable of further modifications, uses or adaptations including variations from the present disclosure as is customary practice in the art. All such modifications, uses, adaptations or variations are considered within the spirit and scope of the invention and the limits of the appended claims.

What is claimed is:

1. A system for input of Chinese characters into a machine, comprising:
   (A) means for input of information, said means for input further comprising means for selecting information from the group consisting of a stroke, wherein strokes are arranged in stroke categories, a component and a character;
   (B) means for storage of data related to the properties of Chinese characters and compounds, wherein said means for storage comprises data related to component parts of a Chinese character;
   (C) means for processing said input information, being based upon an order of strokes used to draw said character, or used to draw subcomponents of a character;
   (D) means for retrieving Chinese characters and compounds based upon stroke sequence, and subcomponent selection, said processing means including a plurality of Chinese character encoding processes based on said stored data; and
   (E) means for display providing an indication of correspondence between elements of said means for input and said display wherein further candidate selection information is suggested in response to user selections and said candidate selection information includes components that incorporate a user selected subcomponent and eliminates other candidates that do not include a user selected subcomponent.

2. The system according to claim 1, wherein said means for input is selected from the group consisting of a keyboard and a touchscreen.

3. The system according to claim 2, wherein said means for input is said touch screen which is incorporated with said display means, and said touch screen comprises a virtual keyboard comprising a representation of keys, each said key representation assigned to selection of a stroke, a component or a character, and said touch screen further comprising a special function key selected from the group consisting of a more key and a wild card key.

4. The system according to claim 2, wherein said means for input is said keyboard, said keyboard comprising keys, each said keys assigned to selection of a stroke, a component or a character, and said keyboard further comprising a special function key selected from the group consisting of a more key and a wild card key.

5. The system according to claim 1, wherein said means for storage comprises data related to component parts of a Chinese word, said data selected from the group consisting of (1) the frequency of occurrence of said word with respect to a user's language, and (2) indicators of said word's membership within the various subsets of all Chinese words.

6. The system according to claim 1, wherein said component is orthographic.

7. The system according to claim 6, wherein said component is selected from the group consisting of a component comprised of fundamental strokes and a component comprised of a plurality of subcomponents.

8. The system according to claim 1, wherein an order for the display of component candidates is based on the cumulative frequencies of all possible Chinese characters and an order for the display of the next drawn candidate is based on the previous selection.

9. The system according to claim 8, wherein the character frequencies are altered as a result of the actual frequency of use of the characters by a specific operator.

10. A computer readable medium for input into a machine having a keyboard and a display screen a desired Chinese text, the computer readable medium having program instructions for performing the steps comprising:
   (A) receiving operator input from an associated device for allowing the operator to select one or more of a stroke, a component and a character;
   (B) in response to a operator input of a stroke, retrieving from one or more associated data structures, candidates that begin with the stroke entered by the operator based upon the frequency of occurrence of said candidate in the operator's language or prior usage, which candidates include one or more of the following:

(i) character candidates including word associated characters and non-word associated characters; and (ii) intermediate structures including a complex component, and a simple subcomponent, wherein said intermediate structures include subcomponents other than radicals;

(C) in response to a operator input of a component selection, determining whether a complex component has been selected, and if a complex component has been selected, removing strokes from an associated buffer, and retrieving from one or more associated data structures components that may include the complex component selected as leading sub-component, and if a simple component is selected, retrieving characters that begin with that component;

(D) in response to a character selection, determining whether a word associated character is selected and if so, retrieving from one or more associated data structures, words beginning with the word associated character, and if a non-word associated character is selected, appending a word separator to an associated character buffer, followed by the selected non-word associated character; and (E) updating the display with one or more retrieved candidates, and allowing the user to make further selections until the desired text is provided.

11. A method for inputting Chinese characters into a machine, comprising the steps of:

(A) inputting a selection for an initial stroke of a Chinese character, wherein the initial stroke is traditionally the first stroke drawn when drawing the Chinese character by hand, and suggesting candidates based upon (1) the identification and order of strokes used to draw said character, said strokes being in accordance with a selected classification scheme, (2) the frequency of occurrence of said character as the first character of a word with respect to an operator's language, (3) the orthographic components of said character in drawing order, and (4) indicators of said character's membership within various subsets of Chinese characters and displaying said candidates in response to said initial stroke input, wherein said candidates include at least one character or at least one subcomponent, being a portion of a character said candidates being limited based upon said user's prior selections of a subcomponent;

(B) selecting a character or, if a desired character is not displayed, selecting a further stroke, wherein the further stroke is traditionally the next stroke drawn when drawing the Chinese character by hand, or a displayed subcomponent, being a next drawn portion of a character; and (C) selecting a word associated character or a non-word associated character, such that Chinese text is constructed with said selections.

12. The method according to claim 11, wherein selection of said non-word associated character automatically appends a word separator.

13. The method according to claim 11, wherein said step of inputting further comprising selecting information from the group consisting of a stroke, a component and a character.

14. The method according to claim 13, further comprising providing a component that is orthographic.

15. The method according to claim 13, wherein said component is selected from the group consisting of a component comprised of fundamental strokes and a component comprised of a plurality of subcomponents.

16. The method according to claim 13, wherein the order for the display of component candidates is based on the cumulative frequencies of all possible Chinese characters and the order for the display of the next drawn candidate is based on the previous selection.

17. The method according to claim 16, wherein the character frequencies are altered as a result of the actual frequency of use of the characters by a specific operator.

18. A computer-readable storage medium having a program recorded thereon for input of Chinese characters into a computer comprising:

(A) means for input of stroke, a component and a character;

(B) means connected to the input means for storage of data including:

(i) a character table that includes, for each of a plurality of characters, data related to the strokes and the sequence of strokes used to write the character and data related to components forming the character; and (ii) a component table that includes, for each of a plurality of components, data related to the strokes and the sequence of strokes used to write the component; and (C) means for processing connected to the input means and the storage means, including:

(i) means for expanding an input through the input means into strokes with reference to the component table;

(ii) means for identifying character candidates having a stroke sequence identical to the sequence of the expanded strokes from the character table;

(iii) means for identifying components, being portions of characters, and for identifying subcomponents, being portions of components, having a stroke sequence identical to the sequence of the expanded strokes from the component table; and (iv) means for presenting the identified character candidates and component candidates for selection on means for display connected to said process means and the storage means wherein candidates are proposed based upon user selections and said candidates include components that incorporate a user selected subcomponent and other candidates that do not include a user selected subcomponent are eliminated.

19. The computer-readable storage medium according to claim 18, wherein character candidates and component candidates are presented in a first area on said display means, and said program further comprises:

means for presenting a stroke input through the input means in a second area on said display means;

means for replacing the strokes being presented in the second area by a component input through the input means; and means for clearing the contents of the second area, and presenting a character input through the input means in a third area on said display means.

* * * * *